US010637102B2

(12) United States Patent
Miura et al.

(10) Patent No.: US 10,637,102 B2
(45) Date of Patent: Apr. 28, 2020

(54) WOUND BATTERY (71) Applicant: Panasonic Intellectual Property Management Co., Ltd., Osaka (JP)

(72) Inventors: Teruhisa Miura, Kyoto (JP); Koki Inoue, Osaka (JP); Akira Kakinuma, Osaka (JP); Katsuhisa Wadasaki, Osaka (JP); Yasutaka Kogetsu, Osaka (JP); Yuki Suehiro, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 160 days.

(21) Appl. No.: 15/735,939

(22) PCT Filed: Jul. 19, 2016

(86) PCT No.: PCT/JP2016/003387
§ 371 (c)(1),
(2) Date: Dec. 12, 2017

(87) PCT Pub. No.: WO2017/017930
PCT Pub. Date: Feb. 2, 2017

(65) Prior Publication Data
US 2018/0183109 A1  Jun. 28, 2018

(30) Foreign Application Priority Data
Jul. 24, 2015 (JP) .................. 2015-146339

(51) Int. Cl.
*H01M 2/08* (2006.01)
*H01M 10/0587* (2010.01)
(Continued)

(52) U.S. Cl.
CPC ....... *H01M 10/0587* (2013.01); *H01M 2/022* (2013.01); *H01M 2/046* (2013.01);
(Continued)

(58) Field of Classification Search
CPC ............ H01M 10/0587; H01M 2/022; H01M 2/0414; H01M 2/046; H01M 2/08; H01M 2/26; H01M 2/263; H01M 10/0525
See application file for complete search history.

(56) References Cited

U.S. PATENT DOCUMENTS

2007/0015046 A1* 1/2007 Kim .................... H01M 2/0413
429/53
2013/0316209 A1  11/2013 Masumoto et al.
2014/0242448 A1*  8/2014 Kakinuma ............. C22C 38/18
429/174

FOREIGN PATENT DOCUMENTS

JP   53-041622 U   4/1978
JP   3-022356 U    3/1991
(Continued)

OTHER PUBLICATIONS

English machine translation of Nishioka et al. (JP 2009043584 A) (Year: 2009).*

(Continued)

*Primary Examiner* — Cynthia K Walls
(74) *Attorney, Agent, or Firm* — McDermott Will & Emery LLP (57) ABSTRACT A winding-type battery includes a battery case, a power generating element, a cap for blocking an opening of the battery case, and a gasket for insulating the battery case from the cap. The first electrode is connected to the cap via a first current collecting lead, and the second electrode is connected to the battery case via a second current collecting lead. A groove is formed near the opening end of the battery case. The gasket includes: an annular seal portion interposed between a rim of the cap and the region from the groove to the end; and a tubular portion that is integrated with the seal portion, and is disposed closer to the electrode group than (Continued)

the seal portion is. The first current collecting lead is connected to the cap through a hollow in the tubular portion.

19 Claims, 8 Drawing Sheets

(51) Int. Cl.
  *H01M 2/26* (2006.01)
  *H01M 2/02* (2006.01)
  *H01M 2/04* (2006.01)
  *H01M 10/0525* (2010.01)

(52) U.S. Cl.
  CPC ........... *H01M 2/0413* (2013.01); *H01M 2/08* (2013.01); *H01M 2/26* (2013.01); *H01M 2/263* (2013.01); *H01M 10/0525* (2013.01)

(56) References Cited

FOREIGN PATENT DOCUMENTS

| | | |
|---|---|---|
| JP | 8-241703 | 9/1996 |
| JP | 11-260347 | 9/1999 |
| JP | 2000-048802 | 2/2000 |
| JP | 2000-323106 | 11/2000 |
| JP | 2001-076707 | 3/2001 |
| JP | 2007234305 A * | 9/2007 |
| JP | 2009043584 A * | 2/2009 |
| JP | 2014-222670 | 11/2014 |

OTHER PUBLICATIONS

English machine translation of Shibaoka et al. (JP 2007234305 A) (Year: 2007).*

International Search Report of PCT application No. PCT/JP2016/003387 dated Oct. 25, 2016.

* cited by examiner

WOUND BATTERY

PRIORITY

This is a National Stage Application under 35 U.S.C. § 371 of International Application PCT/JP2016/003387, with an international filing date of Jul. 19, 2016, which claims priority to Japanese Patent Application No. 2015-146339 filed on Jul. 24, 2015. The entire disclosures of International Application PCT/JP2016/003387 and Japanese Patent Application No. 2015-146339 are hereby incorporated herein by reference.

TECHNICAL FIELD

The present invention relates to a battery including a winding-type electrode group, particularly to a winding-type battery including a battery case having a small outer diameter.

BACKGROUND ART

Recently, the performance of portable devices has been remarkably increasing. It is desired that power sources of such portable devices are small and have a high capacity. While, the manufacturing of high-capacity batteries becomes difficult as the sizes of the batteries become small.

Patent Literature 1 discloses a battery that includes a small cylindrical metal can, a winding-type electrode group accommodated in the metal can, and a sealing member for sealing an opening in the metal can. In order to suppress an internal short circuit, a ring-shaped insulating member is disposed between an end surface of the electrode group and the sealing member. For the same purpose, in Patent Literature 2, a plate-shaped insulating ring is covered on the end surface of the electrode group.

CITATION LIST

Patent Literature

PTL 1: Unexamined Japanese Patent Publication No. 2014-222670
PTL 2: Unexamined Japanese Patent Publication No. 2000-48802

SUMMARY OF THE INVENTION

In Patent Literatures 1 and 2, an independent insulating member is disposed between an electrode group and a sealing member. An operation of disposing such an insulating member in a battery case requires carefulness as the battery becomes small. For example, when the insulating member has been obliquely inserted into the battery case, the insulating member can be damaged during processing of the proximity of an opening in the battery case. During the processing, a load is charged also on an end surface of the electrode group, and the electrode group can be damaged. When the size or processing accuracy of the insulating member varies, an operation of inserting the insulating member into the battery case becomes more difficult. When the battery is vibrated during the use of the battery, it is feared that the insulating member collides against the electrode group to damage the electrode group.

In view of the above-mentioned problems, a winding-type battery of one aspect of the present disclosure includes: a battery case having an opening; a power generating element accommodated in the battery case; a cap for blocking the opening in the battery case; and a gasket for insulating the battery case from the cap. The power generating element includes a first electrode, a second electrode having a polarity different from that of the first electrode, a separator interposed between the first electrode and the second electrode, and an electrolyte. The first electrode and the second electrode are wound via the separator to form an electrode group, and the first electrode is connected to the cap via a first current collecting lead, and the second electrode is connected to the battery case via a second current collecting lead. Near the end forming the opening in the battery case, an annular groove is formed so as to reduce the diameter of the battery case. The gasket includes: an annular seal portion interposed between a rim of the cap and the region from the groove of the battery case to the end thereof; and a tubular portion that is integrated with the seal portion, and is disposed coaxially with the seal portion and disposed closer to the electrode group than the seal portion is. The first current collecting lead is connected to the cap through a hollow in the tubular portion.

The present disclosure can simplify the manufacturing process of a winding-type battery and reduce the cost of the manufacturing process, can reduce the defective fraction during manufacturing the battery, and can increase the vibration resistance of the battery.

DESCRIPTION OF EMBODIMENT(S)

A winding-type battery of the present disclosure includes: a battery case having an opening; a power generating element accommodated in the battery case; a cap for blocking the opening in the battery case; and a gasket for insulating the battery case from the cap. The power generating element includes a first electrode, a second electrode having a polarity different from that of the first electrode, a separator interposed between the first electrode and the second electrode, and an electrolyte. The first electrode and the second electrode are wound via the separator to form an electrode group. The electrode group is a columnar portion including a first end surface and a second end surface opposite to the first end surface. Hereinafter, the end surface disposed on the opening side of the battery case is referred to as "first end surface", and the end surface disposed on the opposite side (when the battery case is a battery can, the bottom side of the battery can) is referred to as "second end surface".

The first electrode generally includes a first current collector sheet, and a first active material layer formed on a surface of the first current collector sheet. The second electrode generally includes a second current collector sheet, and a second active material layer formed on a surface of the second current collector sheet. The first electrode is connected to the conductive cap via a first current collecting lead. The second electrode is connected to the conductive battery case via a second current collecting lead.

Near the end forming the opening in the battery case, an annular groove is formed so as to reduce the diameter of the battery case. The groove has a function of positioning the cap. The gasket includes an annular seal portion and a tubular portion disposed closer to the electrode group than the seal portion is. The seal portion is interposed between a rim of the cap and the region from the groove of the battery case to the end forming the opening, and has a function of keeping the airtightness in the battery case. The tubular portion is integrated with the annular seal portion, and is disposed coaxially with the seal portion and disposed closer to the electrode group than the seal portion is. The tubular portion suppresses an internal short circuit that can occur in a space between the electrode group and the cap. In other words, the tubular portion has a function partially common with that of the insulating member or insulating ring described in Patent Literatures 1 and 2.

In this structure, the coaxial state means the state in which all of the openings at both ends of an annular seal portion and tubular portion substantially face the opening in the battery case, and the axis of the seal portion does not always need to be the same as that of the tubular portion. The coaxial state includes not only the state that the annular seal portion and tubular portion have a common axis, but also the state that the axis of the seal portion crosses that of the tubular portion at an angle of about 0° to 15°.

The first current collecting lead is connected to the cap (specifically, the inner surface of the cap disposed in a battery case) through a hollow in the tubular portion. By passing the first current collecting lead through the hollow in the tubular portion, the first current collecting lead is protected by the tubular portion. The contact of the first current collecting lead with the second electrode, second current collecting lead, or battery case is also suppressed.

By integrating the seal portion with the tubular portion as discussed above, the number of components is decreased, and the man-hour of manufacturing is decreased. Therefore, the manufacturing process of the battery can be simplified, and the manufacturing cost can be reduced. Furthermore, the seal portion of the gasket is positioned by the groove formed in the battery case, so that the positioning of the whole gasket including the tubular portion is facilitated even when the size or processing accuracy of the gasket varies somewhat. Therefore, a problem in which the tubular portion becomes oblique in the battery case does not occur, and the defective fraction during manufacturing the battery can be reduced.

Furthermore, the tubular portion is fixed in the opening in the battery case via the seal portion, so that the distance between the tubular portion and the electrode group (specifically, the first end surface of the battery group) is easily kept constant. For example, by forming a clearance between the tubular portion and the electrode group, the contact of the electrode group with the tubular portion is suppressed and the deformation of the electrode group is avoided. Even when the battery is vibrated, the risk that the collision of the tubular portion against the electrode group is repeated is eliminated. Preferably, shortest distance G between the tubular portion and the electrode group is 0.2 mm to 1.1 mm. At the end of the tubular portion, preferably, the area of the end surface facing the electrode group is large. Even if a great impact is exerted on the battery from the outside, the deformation of the electrode group due to a collision of the first end surface of the electrode group against the tubular portion can be suppressed. It is preferable that the region corresponding to 10% to 95% of the area of the first end surface of the electrode group faces the end of the tubular portion.

It is preferable that the ratio (h/d) of height h of the tubular portion to outer diameter d of the tubular portion is 0.3 to 1.0. Thus, the thickness of the tubular portion can be kept sufficient.

The ratio (L/H) of length L of the first current collecting lead to shortest distance H between the cap and the electrode group is not particularly limited, but, preferably, the ratio is 1.4 to 5.0 for example.

By forming a space between the cap and the electrode group, the second current collecting lead can be extended from the first end surface of the electrode group to the opening side of the electrode case and can be connected to the proximity of the opening in the electrode case. At this time, preferably, the connection position between the second current collecting lead and the electrode case faces the outer peripheral surface of the tubular portion. Thus, the tubular portion of the gasket is generally interposed between the first current collecting lead and the second current collecting lead, and hence the contact between these leads is avoided.

It is preferable that a clearance is formed between the outer peripheral surface of the tubular portion and the connection position between the second current collecting lead and the electrode case. The existence of the clearance prevents the connection position from being damaged when the tubular portion is inserted into the electrode case.

The ratio (D/d) of inner diameter D of the groove to outer diameter d of the tubular portion is not particularly limited, but is required to be 1.0 to 1.7 for example.

It is also sufficient that the seal portion is partially joined to the tubular portion via a joint portion. At this time, a clearance is formed in the boundary, other than the joint portion, between the seal portion and the tubular portion.

The tubular portion may have a slit or hole as long as, in the space between the electrode group and the cap, the tubular portion can cover the periphery of the first current collecting lead and can suppress an internal short circuit that can be caused by contact with the first current collecting lead.

The importance of integrating the annular seal portion with the tubular portion is great especially when the outer diameter of the battery case is 10 mm or less, furthermore 6 mm or less, and especially 4.5 mm or less. The reason is as follows: when the outer diameter (for example, the outer diameter of the cross section perpendicular to the axial direction of the metal can) of the battery case is small, the defective fraction during manufacturing the battery is difficult to be reduced, and also the demand of simplification and cost reduction of the manufacturing process is high. It is difficult to decrease the outer diameter of the battery case to less than 1 mm, so that the outer diameter is preferably 1 mm or more.

As the battery case, a bottomed cylindrical metal can is suitable. From the viewpoint of keeping the strength, it is preferable that the metal can is made of stainless steel. Preferably, the can wall of the metal can has a thickness of 0.05 mm to 0.2 mm.

Hereinafter, taking, as an example, the case that the first electrode is a positive electrode and the second electrode is a negative electrode, an exemplary embodiment of the present invention is described in detail with reference to the accompanying drawings. For simplifying the description, elements having substantially the same functions are denoted by the same reference marks in the following drawings. Here, the winding axis direction of the electrode group is referred to as "first direction", and the direction perpendicular to the winding axis direction is referred to as "second direction".

Figure 1:
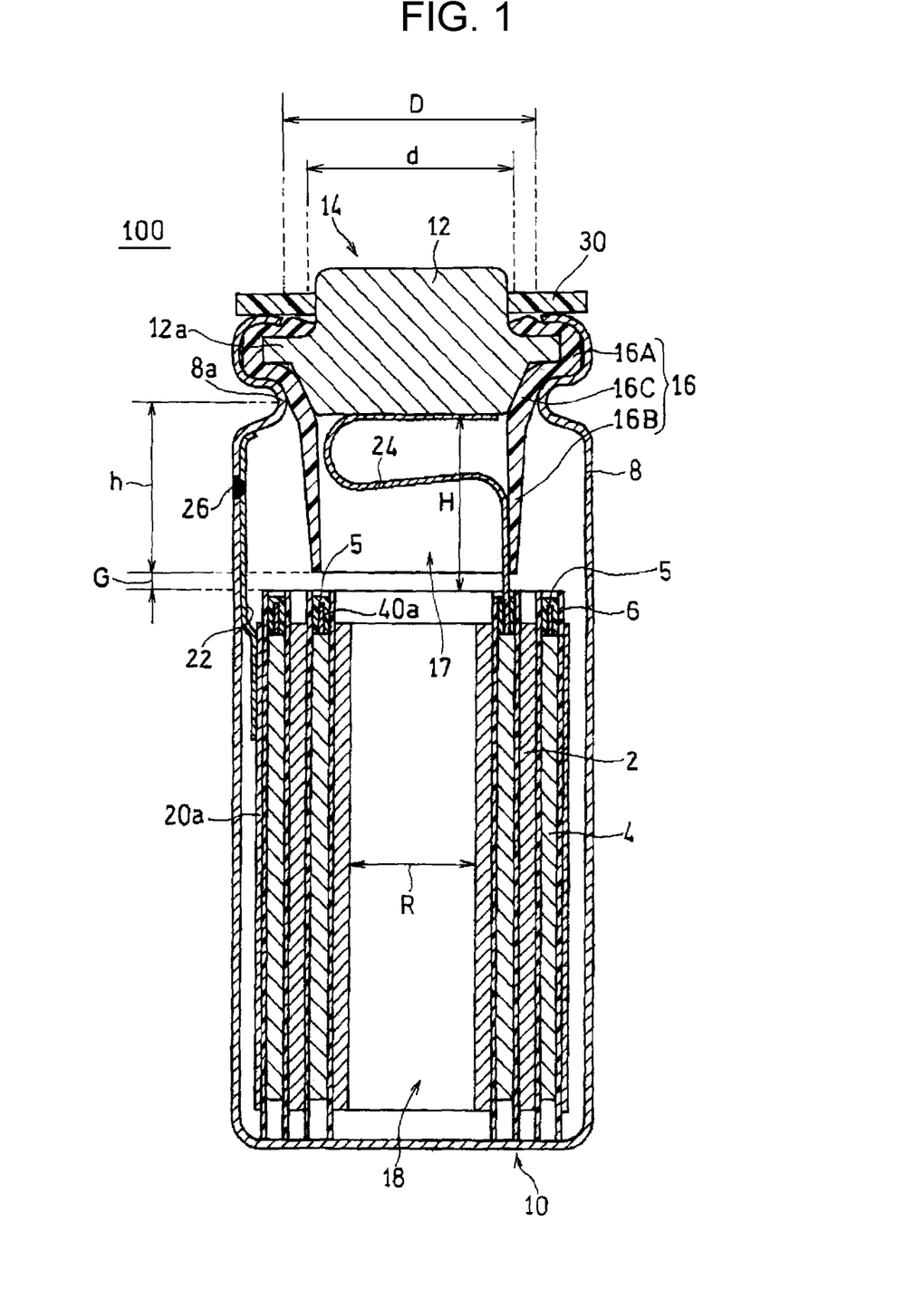
FIG. 1 is a vertical sectional view of a cylindrical winding-type battery in accordance with an exemplary embodiment of the present invention.

FIG. 1 is a vertical sectional view of a cylindrical winding-type battery in accordance with an exemplary embodiment of the present invention. A power generating element of winding-type battery 100 includes positive electrode 4 as a first electrode, negative electrode 2 as a second electrode, separator 6 interposed between the first electrode and the second electrode, and an electrolyte (not shown). Positive electrode 4 and negative electrode 2 are wound via separator 6 to produce an electrode group. The proximity of the winding axis of the electrode group is hollow 18 having no power generating element.

The battery case includes bottomed cylindrical metal can 8, and an opening in metal can 8 is sealed with cap 12 having flange 12a on its rim. Annular groove 8a is formed near the end forming the opening in metal can 8 so as to reduce the diameter of metal can 8. Groove 8a positions cap 12 by supporting flange 12a of cap 12.

Gasket 16 includes annular seal portion 16A, and tubular portion 16B disposed closer to the electrode group than seal portion 16A is. Tubular portion 16B is disposed integrally and coaxially with seal portion 16A. Seal portion 16A is interposed between flange 12a of cap 12 and the region from groove 8a of metal can 8 to the end forming the opening, and seals the gap between them. While, tubular portion 16B is accommodated in a space between the first end surface of the electrode group and cap 12.

A clearance is formed between the first end surface of the electrode group and the end (tip) of tubular portion 16B that is disposed on the most first end-surface side. At this time, shortest distance G (namely, minimum width of the clearance) between the electrode group and tubular portion 16B is preferably 0.2 mm to 1.1 mm, more preferably 0.2 mm to 0.7 mm. Even when shortest distance G is longer than 1.1 mm, there is no problem in terms of performance, but the length of the battery case becomes excessively long and the volume energy density of the battery decreases. Here, shortest distance G may be shorter than 0.2 mm, or may be 0 mm. The reason is as follows: even when there is no clearance between the first end surface of the electrode group and tubular portion 16B, a load due to the positional displacement of tubular portion 16B is not charged on the electrode group because seal portion 16A integrated with tubular portion 16B is caulked to cap 12. In consideration of the possibility of the positional displacement of the electrode group, however, it is preferable to form a clearance of shortest distance G of 0.2 mm or more between the first end surface and tubular portion 16B.

If an impact is exerted on the battery from the outside due to a fall or the like of the battery, the electrode group can move in the winding axis direction in the battery case and can collide against an end of the tubular portion. Therefore, there is the risk of damaging the first end surface. In order to avoid the damage due to the collision, therefore, it is preferable that the pressure due to the collision is dispersed at the end of the tubular portion by increasing the surface area facing the first end surface of the electrode group. Specifically, it is preferable that the region corresponding to 10% to 95% of the area of the first end surface of the electrode group faces the end surface of the end of the tubular portion. Here, the area is the surface area calculated from the maximum outer diameter of the electrode group, and includes the surface area of hollow 18. Furthermore, 15% to 85% and 20% to 80% are more preferable.

Both of negative-electrode current collecting lead 22 and positive-electrode current collecting lead 24 project from the first end surface of the electrode group and extend on the opening side of metal can 8. Negative-electrode current collecting lead 22 is connected to connection position 26 on the inner surface of the side wall near the opening in metal can 8. Metal can 8 also serves as negative-electrode terminal 10. While, positive-electrode current collecting lead 24 is connected to the inner surface of cap 12, which also serves as positive-electrode terminal 14, through hollow 17 in tubular portion 16B. Thus, the most part of positive-electrode current collecting lead 24 is accommodated in hollow 17 of tubular portion 16B, so that an internal short circuit due to contact between these leads is suppressed. The connection is performed by resistance welding using an electrode for welding, for example.

Height h of tubular portion 16B is appropriately selected in accordance with the size of the space between the cap and the electrode group. However, the ratio (h/d) of height h to outer diameter d of the tubular portion is preferably 0.3 to 1.0, more preferably 0.6 to 0.7. When the h/d ratio is the above-mentioned range, tubular portion 16B has a sufficient thickness, and hence hollow 17 capable of accommodating a great part of the positive-electrode current collecting lead can be disposed.

Height h of tubular portion 16B is the shortest distance from the end of tubular portion 16B that is disposed on the most first end-surface side to the position (height) at which the diameter of groove 8a formed in metal can 8 is the smallest. Furthermore, when outer diameter d of tubular portion 16B is not constant (for example, tubular portion 16B has a tapered shape, which narrows toward the tip), the h/d ratio is calculated on the basis of the minimum value of outer diameter d.

Preferably, the ratio (L/H) of length L of positive-electrode current collecting lead 24 to shortest distance H between cap 12 and the electrode group is preferably 1.4 to 5.0, more preferably 1.8 to 3.6. Thus, positive-electrode current collecting lead 24 is easily accommodated in hollow 17 in tubular portion 16B in a bent state, and an operation of electrically connecting positive-electrode current collecting lead 24 to cap 12 is facilitated. Here, length L of positive-electrode current collecting lead 24 includes the lengths of the fused portions that are used for the connection to positive electrode 4 and the connection to cap 12.

A winding-type battery is assembled using the following method, for example.

First, the electrode group is inserted into metal can 8 through the opening. At this time, by inserting the electrode group into metal can 8 with the second end-surface facing metal can 8, the first end surface from which negative-electrode current collecting lead 22 and positive-electrode current collecting lead 24 are projected is disposed on the opening side of metal can 8. Then, negative-electrode current collecting lead 22 is welded to connection position 26, and furthermore annular groove 8a is formed near the end forming the opening in metal can 8 so as to reduce the diameter of metal can 8. Next, gasket 16 is inserted into metal can 8 with tubular portion 16B facing metal can 8, and seal portion 16A is mounted on groove 8a. At this time, positive-electrode current collecting lead 24 is passed through hollow 17 in tubular portion 16B. While, connection position 26 between negative-electrode current collecting lead 22 and metal can 8 faces the outer peripheral surface of tubular portion 16B. Thus, tubular portion 16B of gasket 16 is generally interposed between negative-electrode current collecting lead 22 and positive-electrode current collecting lead 24, and hence contact between these leads is avoided.

Next, positive-electrode current collecting lead 24 is welded to cap 12, and an electrolyte is subsequently injected into metal can 8 by a depressurization method. Then, cap 12 is mounted on groove 8a via seal portion 16A. Finally, the end of metal can 8 is caulked to flange 12a of cap 12 via seal portion 16A of gasket 16, thereby producing cylindrical winding-type battery 100. Seal portion 16A is slightly exposed from the end of caulked metal can 8. The exposed portion of seal portion 16A is covered with insulating material 30 and protected. Insulating material 30 may be a ring-shaped member, and may be formed by coating it with a resin material containing a solvent and then volatilizing the solvent.

As discussed above, since tubular portion 16B is inserted through the opening into metal can 8 after forming of groove 8a, a clearance is formed between the outer peripheral surface of tubular portion 16B and connection position 26 between negative-electrode current collecting lead 22 and metal can 8. The existence of such a clearance prevents connection position 26 from being damaged during the insertion of tubular portion 16B into metal can 8.

Here, the ratio (D/d) of inner diameter D of groove 8a to outer diameter d of tubular portion 16B is preferably 1.0 to 1.7, more preferably 1.0 to 1.4. By setting outer diameter d of tubular portion 16B to be equal to or smaller than inner diameter D of groove 8a, tubular portion 16B is easily passed through groove 8a and hence the operation of mounting gasket 16 in the opening in metal can 8 is facilitated. Furthermore, since outer diameter d of tubular portion 16B is kept sufficiently large, the operation of inserting positive-electrode current collecting lead 24 into hollow 17 is also facilitated. Also in this case, when outer diameter d of tubular portion 16B is not constant, the D/d ratio is calculated on the basis of a minimum value of outer diameter d.

Next, the structure of gasket 16 is further described. In FIG. 1, gasket 16 includes, between annular seal portion 16A and tubular portion 16B, boundary portion 16C having a funnel shape or tapered shape in which the diameter becomes smaller from seal portion 16A toward tubular portion 16B. Forming boundary portion 16C in the funnel shape can homogenize the stress applied to gasket 16 when the end of metal can 8 is caulked, and can increase the contact surface area with groove 8a of metal can 8. Tubular portion 16B has a tapered shape in which the outer diameter becomes smaller as it approaches the first end surface of the electrode group. Thus, the operation of inserting tubular portion 16B of gasket 16 into the opening in metal can 8 is further facilitated.

The shape of gasket 16 is not particularly limited except the following conditions:
gasket 16 includes an annular seal portion and a tubular portion that are integrated with each other; and
the outer diameter of the tubular portion is smaller than the outer diameter of the seal portion.
For example, the outer diameter of tubular portion 16B may be constant.

Figure 2:
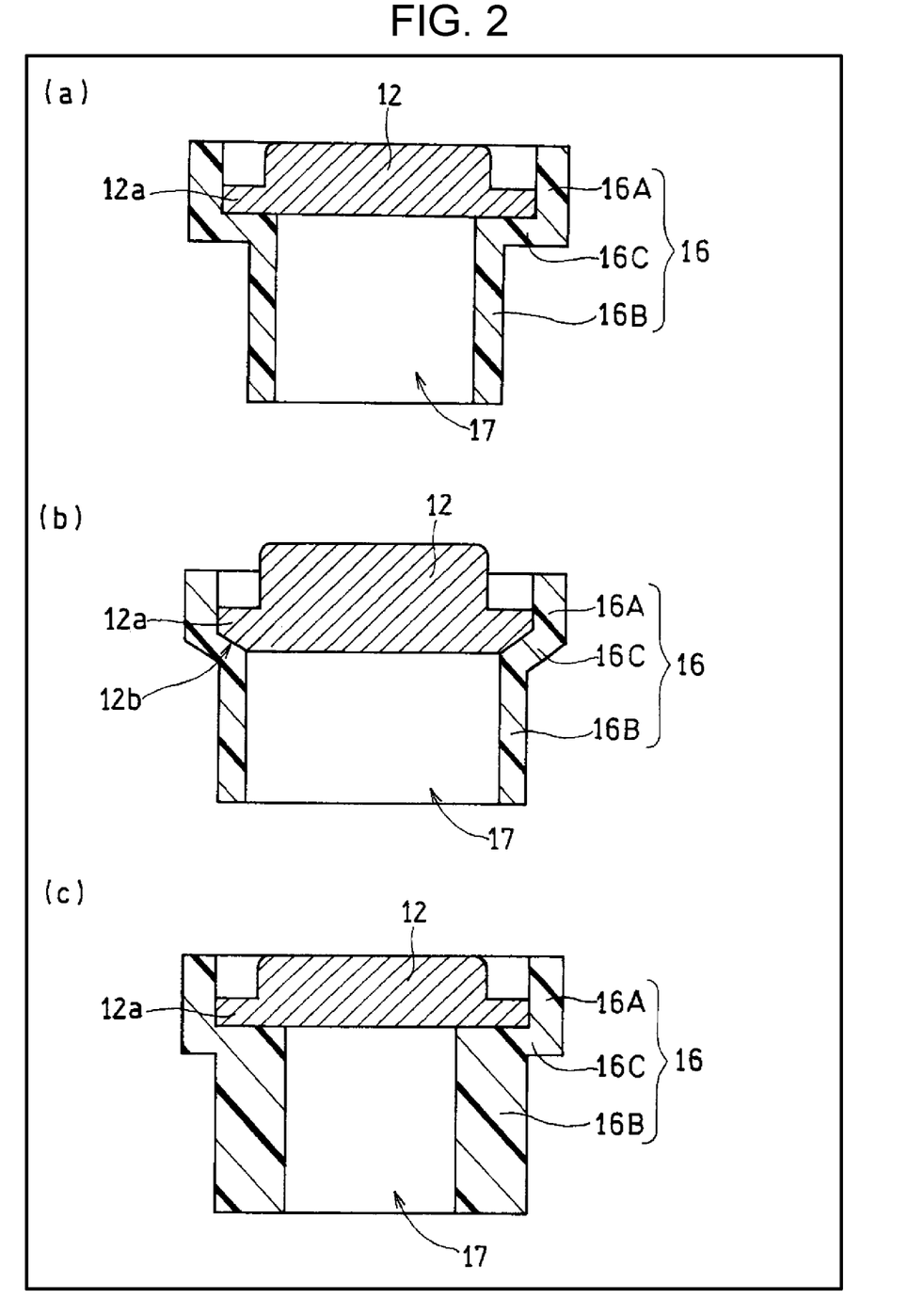
FIG. 2 is a diagram showing a variation of a gasket.

FIG. 2 shows a variation of gasket 16 in which annular seal portion 16A and tubular portion 16B are integrated with each other. In gaskets 16 in FIG. 2 (a) and FIG. 2 (c), boundary portion 16C has not a funnel shape but a flat inner flange shape. Gasket 16 in FIG. 2 (b) has funnel-shaped boundary portion 16C as in the case of FIG. 1. In the case of FIG. 2 (b), cap 12 has inclined surface 12b in accordance with the shape of boundary portion 16C, and it can be expected that the stress on cap 12 is homogenized and the sealing property is improved. In gasket 16 in FIG. 2 (c), the thickness of the side wall of tubular portion 16B is greater than that of seal portion 16A. Thus, the strength of tubular portion 16B is increased, and hence damage of gasket 16 is suppressed when it is inserted into the opening in metal can 8.

Figure 3:
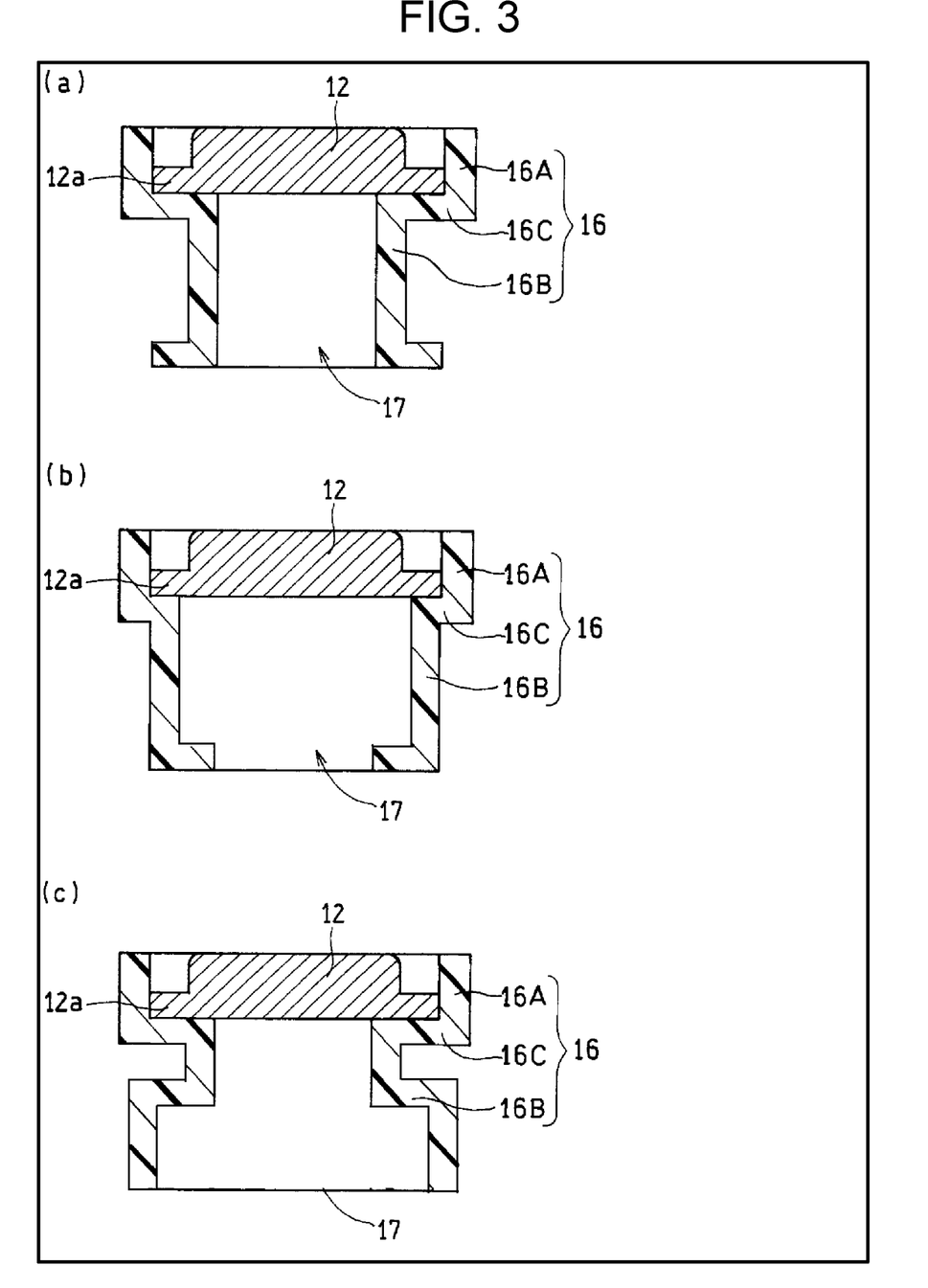
FIG. 3 is a diagram showing another variation of a gasket.

FIG. 3 shows another variation of gasket 16 in which annular seal portion 16A and tubular portion 16B are integrated with each other. In gasket 16 in each of FIG. 3 (a) and FIG. 3 (b), the thickness of the end of tubular portion 16B is increased, thereby increasing the area of annular end surface S facing the first end surface of the electrode group. Preferably, the region corresponding to 10% to 95% of the area of the first end surface of the electrode group faces end surface S of the end of tubular portion 16B. Thus, the damage of the electrode group due to an impact from the outside can be suppressed.

The end of tubular portion 16B may be formed so that the thickness becomes large in the outside direction of the battery as shown in FIG. 3 (a), may be formed so that the thickness becomes large in the inside direction of the battery as shown in FIG. 3 (b), or may be formed so that its thickness becomes large in both directions. Tubular portion 16B may be formed so that the thickness becomes larger toward the end.

The gasket in FIG. 3 (c) has a region of a large diameter on at least electrode group side of tubular portion 16B so that the volume of hollow 17 in tubular portion 16B is large. Such a shape allows the workability to be improved in a process of welding the first current collecting lead to the cap 12. Furthermore, when the battery is configured so that the connection position between the second current collecting lead and the electrode case faces the outer peripheral surface of the tubular portion, the clearance formed between the connection position and the outer peripheral surface of the tubular portion can be decreased. Therefore, the accident is suppressed in which, if an impact is exerted on the battery from the outside, the second current collecting lead bends in the clearance to cause a connection failure. Thus, the reliability can be further improved. In FIG. 3 (c), the end of the tubular portion may be formed so that the area of the end surface is large.

Figure 4:
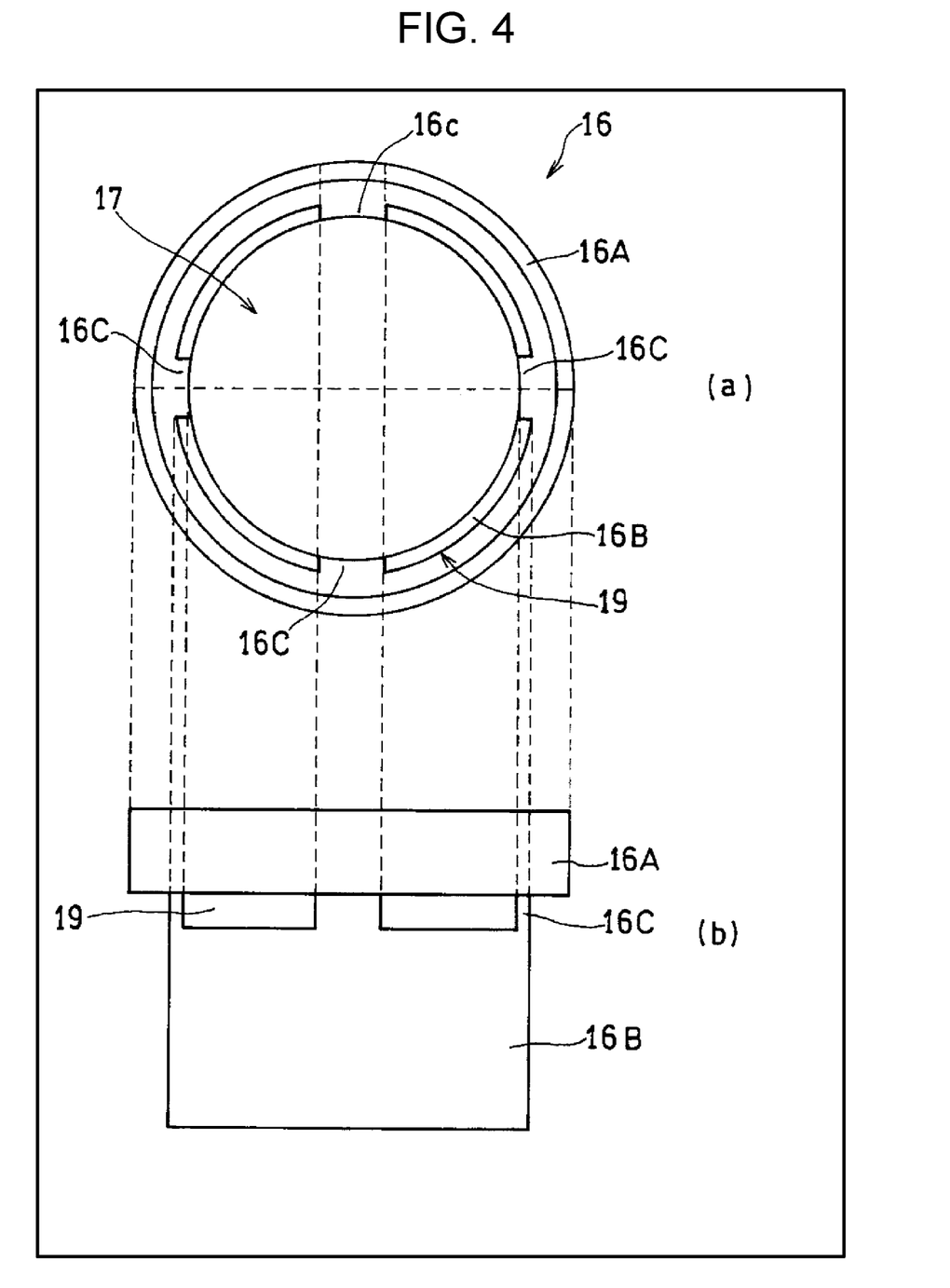
FIG. 4 is a diagram showing a gasket in which a seal portion is partially joined to a tubular portion, (a) is a top view of the gasket in which the seal portion is partially joined to the tubular portion, and (b) is a front view of the gasket.

FIG. 4 shows an example of a gasket in which seal portion 16A is partially joined to tubular portion 16B. FIG. 4 (a) is a top view of gasket 16, and FIG. 4 (b) is a front view of the gasket. In the boundary between seal portion 16A and tubular portion 16B, joint portions 16C for integrating seal portion 16A with tubular portion 16B, and clearances 19 are formed. The existence of clearances 19 smoothly promotes the operation of filling an electrolyte into the battery case.

When no clearance 19 exists in the boundary between seal portion 16A and tubular portion 16B, the electrolyte always arrives at the electrode group after passing through hollow 17 in tubular portion 16B. While, when clearances 19 exist, the electrolyte arrives at the electrode group not only after passing through hollow 17 in tubular portion 16B, but also after passing through clearances 19 and going around to the outside of tubular portion 16B. Therefore, the impregnation rate of the electrolyte increases.

Preferably, the material of gasket 16 has a resistance to an electrolyte, and includes polyolefin, polyamide, or fluorine resin. Especially, fluorine resin is preferable. For example, it is preferable to employ a copolymer of tetrafluoroethylene and perfluoroalkoxyvinylether.

Next, the configuration of the electrode group is further described.

(Positive Electrode)

Figure 5:
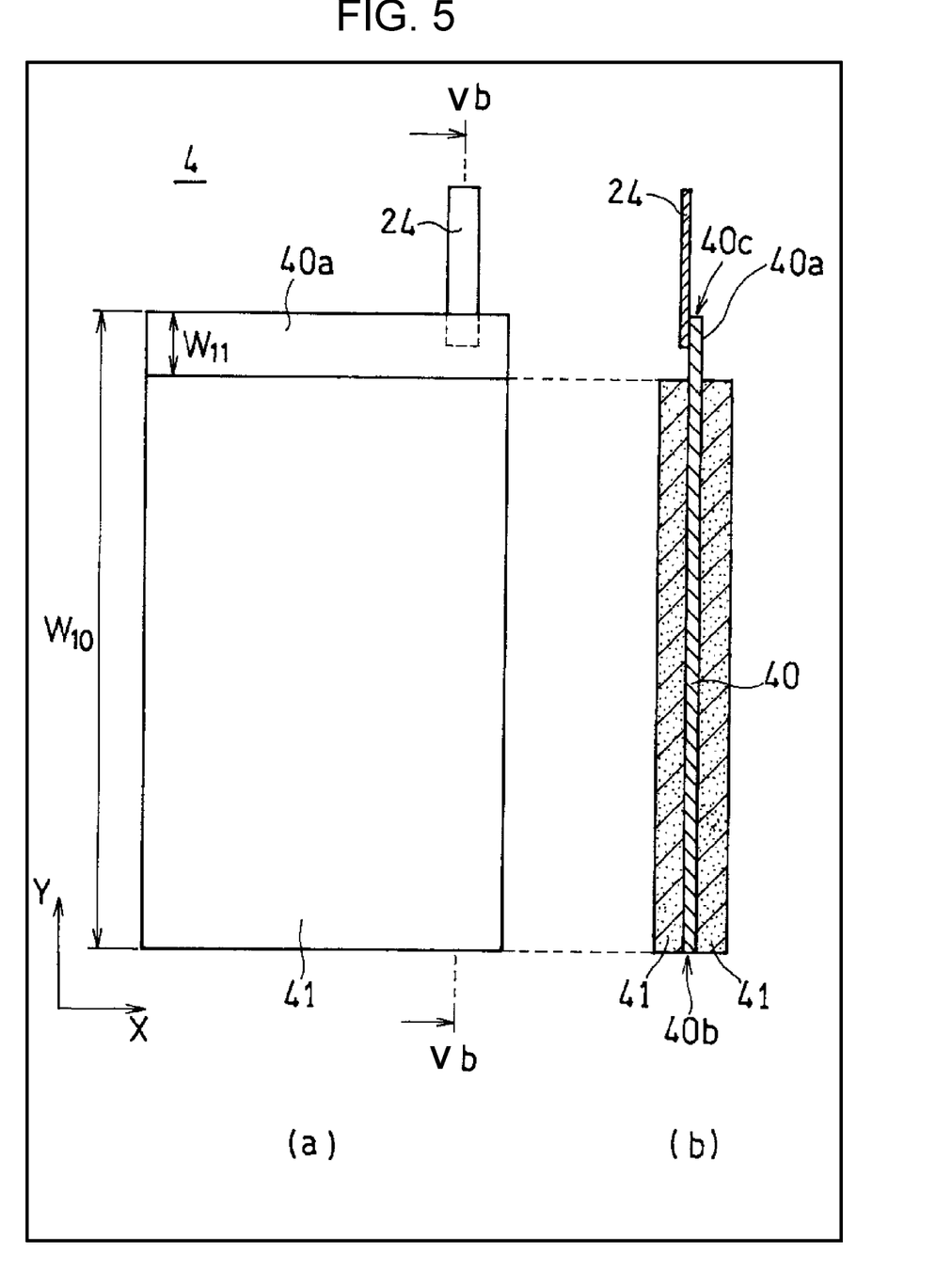
FIG. 5 is a diagram schematically showing a first electrode, (a) is a plan view schematically showing the first electrode, and (b) is a sectional view of the first electrode taken along line Vb-Vb.

As shown in FIG. 5, positive electrode 4 includes: positive-electrode current collector sheet 40 as the first current collector sheet; and positive-electrode active material layers 41 formed on the opposite surfaces of positive-electrode current collector sheet 40. In the case that the winding-type battery is a lithium-ion battery, preferably, metal foil of aluminum or aluminum alloy is employed as the material of positive-electrode current collector sheet 40, for example. The thickness of the positive-electrode current collector sheet is not particularly limited, but is preferably 10 μm to 20 μm.

Positive-electrode active material layer 41 includes a positive-electrode active material as an essential component, and includes a binder and conductive agent as optional components. As the positive-electrode active material of a lithium-ion secondary battery, a composite oxide containing lithium is preferable, and $LiCoO_2$, $LiNiO_2$, or $LiMn_2O_4$ is employed for example. As the positive-electrode active material of a lithium-ion primary battery, manganese dioxide or graphite fluoride is employed. The thickness of the positive-electrode active material layer is not particularly limited, but is preferably 70 μm to 130 μm.

As the material of positive-electrode current collecting lead 24 in a lithium-ion battery, preferably, aluminum, aluminum alloy, nickel, nickel alloy, iron, or stainless steel is employed, for example. The thickness of positive-electrode current collecting lead 24 is preferably 10 μm to 120 μm. The shape of positive-electrode current collecting lead 24 is not particularly limited. However, positive-electrode current collecting lead 24 has a stripe shape having a width of 0.5 mm to 3 mm and a length of 3 mm to 10 mm, for example.

Positive-electrode current collector sheet 40 has a rectangular shape. In the present exemplary embodiment, the longitudinal direction (Y direction in FIG. 1) coincides with the winding axis direction (first direction). One end (hereinafter, first end) in the first direction includes first uncoated portion 40a on which positive-electrode current collector sheet 40 is exposed. The first end is disposed on the first end-surface side of the electrode group. First uncoated portion 40a is disposed in a band shape along the first end. One end of strip-shaped positive-electrode current collecting lead 24 is connected to first uncoated portion 40a by welding.

At the other end (hereinafter, second end) of positive electrode 4 in the first direction, the positive-electrode current collector sheet is not exposed, and positive-electrode active material layer 41 is formed on the whole of both surfaces except edge surface 40b of the second end. Also at each of the opposite ends of positive-electrode current collector sheet 40 in the second direction (X direction in FIG. 1), the whole of both surfaces except the edge surface and the portion corresponding to the first uncoated portion is covered with positive-electrode active material layer 41. Here, "edge surface" corresponds to the cross section in the thickness direction that is formed by cutting the current collector sheet.

Width $W_{10}$ of positive-electrode current collector sheet 40 in the first direction is selected in accordance with the length of the metal can or the battery capacity. Width $W_{11}$ of first uncoated portion 40a is preferably 2 mm to 4 mm.

Figure 6:
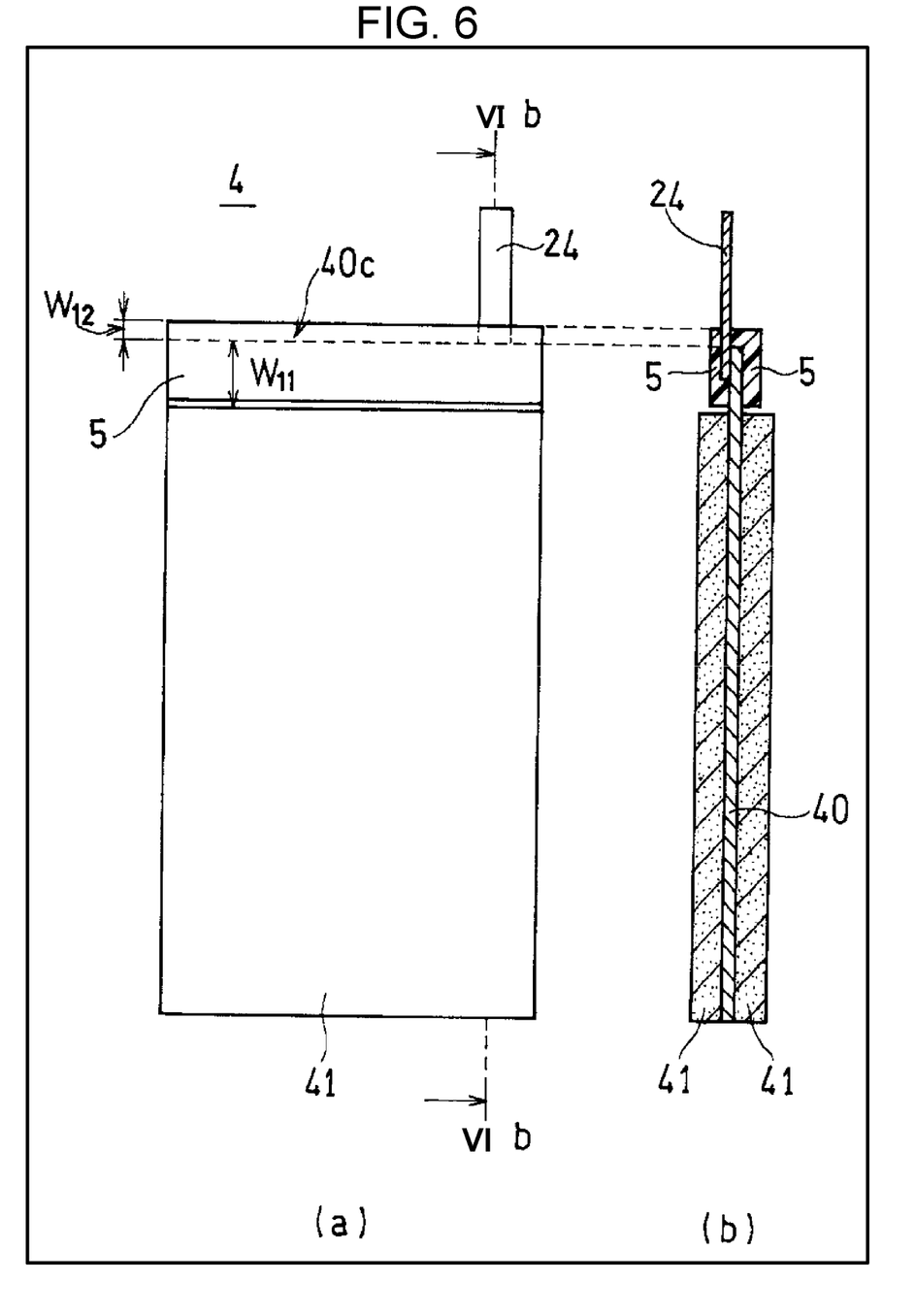
FIG. 6 is a diagram schematically showing another first electrode, (a) is a plan view schematically showing the first electrode, and (b) is a sectional view of the first electrode taken along line VIb-VIb.

FIG. 6 schematically shows the state in which the front and rear surfaces of first uncoated portion 40a of positive-electrode current collector sheet 40 are covered with insulating layer 5. Insulating layer 5 is disposed in a band shape along the first end so as to cover edge surface 40c of the first end (first uncoated portion 40a). Although not required, it is preferable that insulating layer 5 covers 90% or more of the total area of both surfaces of first uncoated portion 40a. Overhang width $W_{12}$ of insulating layer 5 from edge surface 40c of first uncoated portion 40a is preferably 0.1 mm to 1 mm.

From the viewpoint of workability, preferably, insulating tape is employed as insulating layer 5. The insulating tape includes an insulating sheet, and a pressure sensitive adhesive layer disposed on one surface of the insulating sheet. The insulating sheet includes polypropylene, polyethylene terephthalate, polyimide, or polyphenylene sulfide. The pressure sensitive adhesive layer includes a rubber pressure sensitive adhesive, an acrylic pressure sensitive adhesive, a silicone pressure sensitive adhesive, or a urethane pressure sensitive adhesive, for example.

(Negative Electrode)

Figure 7:
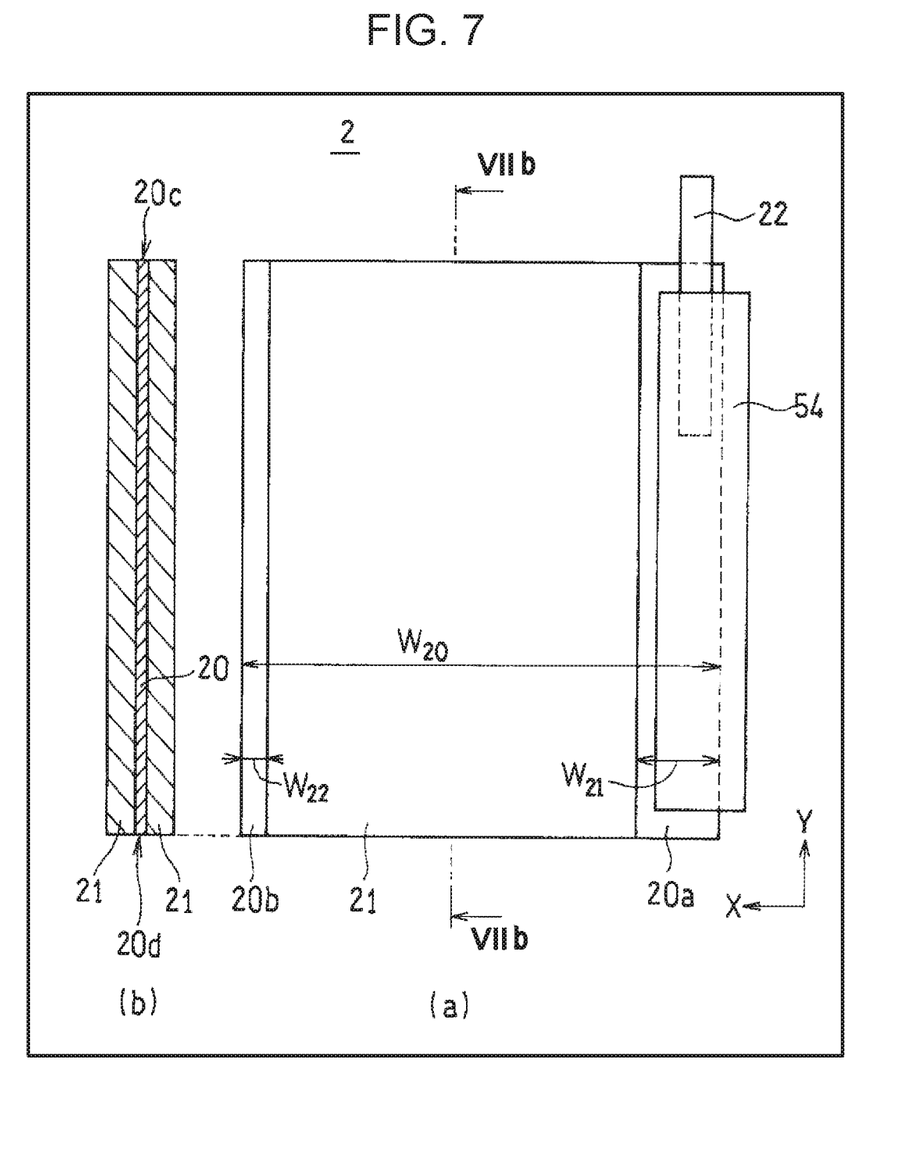
FIG. 7 is a diagram schematically showing a second electrode, (a) is a plan view schematically showing the second electrode, and (b) is a sectional view of the second electrode taken along line VIIb-VIIb.

As shown in FIG. 7, negative electrode 2 includes: negative-electrode current collector sheet 20 as the second current collector sheet; and negative-electrode active material layers 21 formed on the opposite surfaces of negative-electrode current collector sheet 20. When the winding-type battery is a lithium-ion battery, preferably, metal foil of stainless steel, nickel, copper, copper alloy, or aluminum is employed as the material of the negative-electrode current collector sheet, for example. The thickness of the negative-electrode current collector sheet is not particularly limited, but is preferably 5 μm to 20 μm.

Negative-electrode active material layer 21 includes a negative-electrode active material as an essential component, and includes a binder and conductive agent as optional components. As the negative-electrode active material of the lithium-ion battery, metal lithium, an alloy (silicon alloy or tin alloy), a carbon material (graphite or hard carbon), a silicon compound, a tin compound, or a lithium titanate compound is employed. The thickness of the negative-electrode active material layer is not particularly limited, but is preferably 70 μm to 150 μm.

As the material of negative-electrode current collecting lead 22 of the lithium-ion battery, preferably, nickel, nickel alloy, iron, stainless steel, copper, or copper alloy is employed, for example. The thickness of negative-electrode current collecting lead 22 is preferably 10 μm to 120 μm. The shape of negative-electrode current collecting lead 22 is not particularly limited. However, negative-electrode current collecting lead 22 has a stripe shape having a width of 0.5 mm to 3 mm and a length of 9 mm to 15 mm, for example.

Negative-electrode current collector sheet 20 has a rectangular shape in which the length in the second direction is set longer than that of positive-electrode current collector sheet 40. One end of negative-electrode current collector sheet 20 in the second direction (X direction in FIG. 4) includes band-shaped second uncoated portion (A) 20a on which the negative-electrode current collector sheet is exposed. Second uncoated portion (A) 20a is connected to one end of strip-shaped negative-electrode current collecting lead 22 by welding. The connection portion is protected by fixing insulating tape 54. From the viewpoint of suppressing the peeling of the negative-electrode active material layer, the other end of negative-electrode current collector sheet 20 in the second direction also may include band-shaped second uncoated portion (B) 20b on which negative-electrode current collector sheet 20 is exposed.

The opposite ends of negative-electrode current collector sheet 20 in the first direction (Y direction in FIG. 4) are covered with negative-electrode active material layer 21, except edge surfaces 20c and 20d at the opposite ends and the portions corresponding to second uncoated portions 20a and 20b.

Preferably, width $W_{21}$ of second uncoated portion (A) 20a is 10% to 50% of width $W_{20}$ of negative-electrode current collector sheet 20 in the second direction. While, width $W_{22}$ of second uncoated portion (B) 20b is required to be 1% to 10% of width $W_{20}$. A negative-electrode active material layer may be formed in at least a part of the rear surface of each of second uncoated portions 20a and 20b. Alternatively, the rear surface of each of second uncoated portions 20a and 20b may be an uncoated portion on which the negative-electrode current collector sheet is exposed, similarly to the front surfaces.

Figure 8:
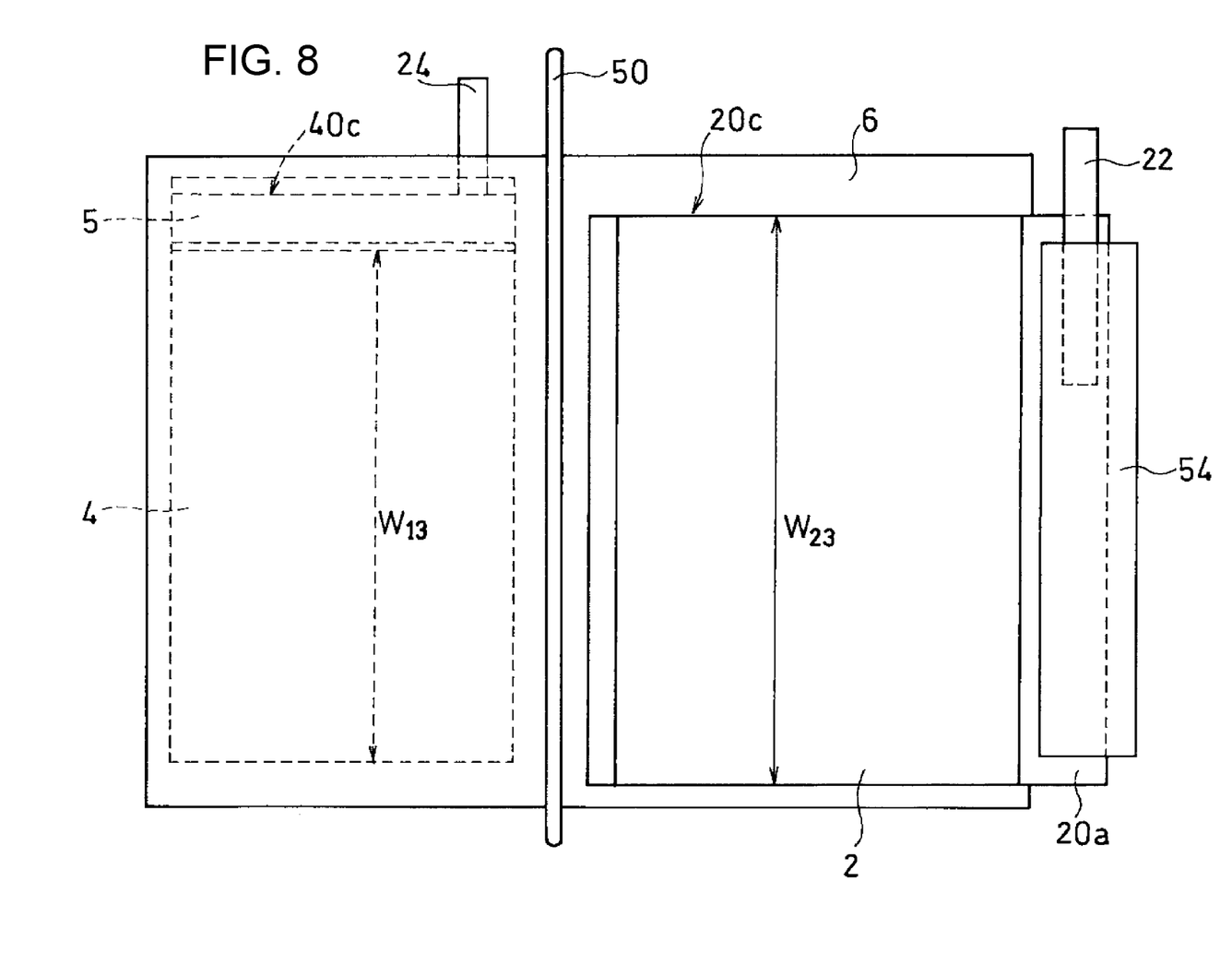
FIG. 8 is a plan view schematically showing the configuration of an electrode group before winding.

FIG. 8 is a plan view schematically showing one example of the configuration of the electrode group before winding.

In the shown example, with respect to separator 6, positive electrode 4 is disposed on the left and rear side of separator 6 and negative electrode 2 is disposed on the right and front side of separator 6. Width $W_{13}$ of positive-electrode active material layer 41 in the winding axis direction (first direction) is slightly narrower than width $W_{23}$ of negative-electrode active material layer 21 in the first direction. Thus, positive electrode 4 and negative electrode 2 are stacked so that positive-electrode active material layer 41 is completely overlaid on negative-electrode active material layer 21. The opposite ends of separator 6 in the first direction and the second direction project more than negative electrode 2 and positive electrode 4. Thus, the risk of an internal short circuit is reduced.

The stacked body of positive electrode 4, separator 6, and negative electrode 2 is wound about winding core 50, thereby producing an electrode group. After the electrode group is produced, winding core 50 is pulled out. Therefore, hollow 18 is formed in the center of the electrode group. The winding core may be left in the battery without being pulled out.

(Separator)

As separator 6 interposed between negative electrode 2 and positive electrode 4, an insulating microporous thin film, woven fabric, or nonwoven fabric is employed. As the material of the separator of a lithium-ion battery, preferably, polyolefin such as polypropylene or polyethylene is employed, for example. The thickness of separator 6 is for example 10 μm to 50 μm, preferably 10 μm to 30 μm.

(Electrolyte)

The electrolyte includes, for example, lithium salt and a non-aqueous solvent in which the lithium salt is dissolved. The non-aqueous solvent is not particularly limited. As the non-aqueous solvent, cyclic carbonate, chain carbonate, or cyclic carboxylic acid ester is employed. As the lithium salt, $LiPF_6$ or $LiBF_4$ is employed, for example.

INDUSTRIAL APPLICABILITY

The present invention is useful for manufacturing a small winding-type battery having a high capacity. The type of the winding-type battery is not limited, but includes various non-aqueous electrolyte batteries represented by a lithium-ion battery. The battery may be a primary battery or a secondary battery. The shape of the battery is required to be a tubular shape, and may be a cylindrical shape or elliptical cylindrical shape. The technological significance of the present invention is enhanced when the outer diameter of the battery case is 10 mm or less, furthermore 6 mm or less, especially 4.5 mm or less.

The invention claimed is:

1. A winding-type battery comprising:
    a battery case having an opening;
    a power generating element accommodated in the battery case;
    a cap for blocking the opening in the battery case; and
    a gasket for insulating the battery case from the cap,
    wherein the power generating element includes:
        a first electrode;
        a second electrode having a polarity different from a polarity of the first electrode;
        a separator interposed between the first electrode and the second electrode; and
        an electrolyte,
    wherein the first electrode and the second electrode are wound via the separator to form an electrode group,
    wherein the first electrode is coupled to the cap via a first current collecting lead,
    wherein the second electrode is coupled to the battery case via a second current collecting lead,
    wherein, near an end forming the opening in the battery case, an annular groove is formed so as to reduce a diameter of the battery case,
    wherein the gasket includes:
        an annular seal portion interposed between a rim of the cap and a region from the groove of the battery case to the end; and
        a tubular portion integrated with the seal portion, and disposed coaxially with the seal portion and closer to the electrode group than the seal portion is,
    wherein the first current collecting lead is coupled to the cap through a hollow in the tubular portion, and
    wherein a ratio (h/d) of a height h of the tubular portion to the outer diameter d of the tubular portion is 0.3 to 1.0.

2. The winding-type battery according to claim 1, wherein a gap is formed between the tubular portion and the electrode group.

3. The winding-type battery according to claim 2, wherein a shortest distance G between the tubular portion and the electrode group is 0.2 mm to 1.1 mm.

4. The winding-type battery according to claim 1, wherein a region corresponding to 10% to 95% of an area of an end surface of the electrode group faces an end of the tubular portion.

5. The winding-type battery according to claim 1, wherein a ratio (L/H) of a length L of the first current collecting lead to a shortest distance H between the cap and the electrode group is 1.4 to 5.0.

6. The winding-type battery according to claim 1, wherein a connection position between the second current collecting lead and the battery case faces an outer peripheral surface of the tubular portion.

7. The winding-type battery according to claim 6, wherein a gap is formed between the connection position and the outer peripheral surface of the tubular portion.

8. The winding-type battery according to claim 1, wherein a ratio (D/d) of the inner diameter D of the groove to the outer diameter d of the tubular portion is 1.0 to 1.7.

9. A winding-type battery comprising:
a battery case having an opening;
a power generating element accommodated in the battery case;
a cap for blocking the opening in the battery case; and
a gasket for insulating the battery case from the cap,
wherein the power generating element includes:
  a first electrode;
  a second electrode having a polarity different from a polarity of the first electrode;
  a separator interposed between the first electrode and the second electrode; and
  an electrolyte,
wherein the first electrode and the second electrode are wound via the separator to form an electrode group,
wherein the first electrode is coupled to the cap via a first current collecting lead,
wherein the second electrode is coupled to the battery case via a second current collecting lead,
wherein, near an end forming the opening in the battery case, an annular groove is formed so as to reduce a diameter of the battery case,
wherein the gasket includes:
  an annular seal portion interposed between a rim of the cap and a region from the groove of the battery case to the end; and
  a tubular portion integrated with the seal portion, and disposed coaxially with the seal portion and closer to the electrode group than the seal portion is,
wherein the first current collecting lead is coupled to the cap through a hollow in the tubular portion,
wherein the seal portion is partially joined to the tubular portion via a plurality of joint portions, and
wherein adjacent joint portions of the plurality of joint portion are separated by a gap.

10. The winding-type battery according to claim 1, wherein
an outer diameter of the battery case is 10 mm or less.

11. The winding-type battery according to claim 1, wherein a bottom end of the tubular portion is bend toward outside.

12. The winding-type battery according to claim 9, wherein the gap is surrounded by the seal portion, the tubular portion, and the adjacent joint portions.

13. A winding-type battery comprising:
a battery case having an opening;
a power generating element accommodated in the battery case;
a cap for blocking the opening in the battery case; and
a gasket for insulating the battery case from the cap,
wherein the power generating element includes:
  a first electrode;
  a second electrode having a polarity different from a polarity of the first electrode;
  a separator interposed between the first electrode and the second electrode; and
  an electrolyte,
wherein the first electrode and the second electrode are wound via the separator to form an electrode group,
wherein the first electrode is coupled to the cap via a first current collecting lead,
wherein the second electrode is coupled to the battery case via a second current collecting lead,
wherein, near an end forming the opening in the battery case, an annular groove is formed so as to reduce a diameter of the battery case,
wherein the gasket includes:
  an annular seal portion interposed between a rim of the cap and a region from the groove of the battery case to the end; and
  a tubular portion integrated with the seal portion, and disposed coaxially with the seal portion and closer to the electrode group than the seal portion is,
wherein the first current collecting lead is coupled to the cap through a hollow in the tubular portion,
wherein a connection position between the second current collecting lead and the battery case is between the cap and the electrode group, and
wherein the connection position faces an outer peripheral surface of the tubular portion.

14. The winding-type battery according to claim 13, wherein
a gap is formed between the tubular portion and the electrode group.

15. The winding-type battery according to claim 14, wherein
a shortest distance G between the tubular portion and the electrode group is 0.2 mm to 1.1 mm.

16. The winding-type battery according to claim 13, wherein
a region corresponding to 10% to 95% of an area of an end surface of the electrode group faces an end of the tubular portion.

17. The winding-type battery according to claim 13, wherein
a ratio (L/H) of a length L of the first current collecting lead to a shortest distance H between the cap and the electrode group is 1.4 to 5.0.

18. The winding-type battery according to claim 13, wherein
a gap is formed between the connection position and the outer peripheral surface of the tubular portion.

19. The winding-type battery according to claim 13, wherein
a ratio (D/d) of the inner diameter D of the groove to the outer diameter d of the tubular portion is 1.0 to 1.7.

* * * * *